United States Patent [19]
Alden et al.

[11] Patent Number: 5,180,898
[45] Date of Patent: Jan. 19, 1993

[54] HIGH VELOCITY CONVEYOR OVEN

[75] Inventors: Lorne B. Alden, Shelburne; James T. Cole, Essex Junction; James E. Lockridge; Thomas E. Costello, both of Burlington, all of Vt.

[73] Assignee: G. S. Blodgett Corporation, Burlington, Vt.

[21] Appl. No.: 735,729

[22] Filed: Jul. 25, 1991

[51] Int. Cl.[5] .............................................. F27B 9/10
[52] U.S. Cl. .................................. 219/388; 219/400
[58] Field of Search ............. 219/388, 400; 126/21 A, 126/21 R, 191, 212; 34/216, 222, 229

[56] References Cited
U.S. PATENT DOCUMENTS

| | | | |
|---|---|---|---|
| 4,83,238 | 5/1989 | Smith | 219/400 |
| 3,580,164 | 5/1971 | Baker | 219/388 |
| 3,908,533 | 9/1975 | Fagerstrom et al. | |
| 4,154,861 | 5/1979 | Smith . | |
| 4,321,031 | 3/1982 | Woodgate | 219/388 |
| 4,338,911 | 7/1982 | Smith . | |
| 4,377,109 | 3/1983 | Brown et al. . | |
| 4,471,000 | 9/1984 | Brown et al. . | |
| 4,505,671 | 3/1985 | McMaster | 219/388 |
| 4,554,437 | 11/1985 | Wagner | 219/388 |
| 4,576,090 | 3/1986 | Burtea . | |
| 4,591,333 | 5/1986 | Henke . | |
| 4,626,661 | 12/1986 | Henke . | |
| 4,679,542 | 7/1987 | Smith et al. . | |
| 4,701,340 | 10/1987 | Bratton et al. . | |
| 4,776,107 | 10/1988 | Buske . | |
| 4,960,100 | 10/1990 | Pellicane . | |
| 4,965,435 | 10/1990 | Smith | 219/388 |
| 5,039,841 | 8/1991 | Kato | 219/388 |
| 5,066,850 | 11/1991 | Kondo | 219/388 |

Primary Examiner—Teresa J. Walberg
Attorney, Agent, or Firm—Lowe, Price, LeBlanc & Becker

[57] ABSTRACT

An improved conveyor oven for cooking food products more efficiently is provided. The delivery system for hot convection currents includes a lower delivery system using tapered slot nozzles which are mutually spaced along the length of travel of the conveyor and extend laterally thereto. The upper heat delivery system utilizes an upper plenum with openings in the lower surface thereof which coincides with the upper surface of the heating chamber. The openings are initially in a first plate, rectangular mutually-spaced openings which extend both laterally and the length of the path of travel of the conveyor. Beneath the rectangular openings tapered slots are provided in registry therewith which extend laterally across the path of travel of the conveyor and open away from the entrance to the upper plenum for the heated air. The slots terminate in depending flanges which also extend substantially laterally to the path of travel of the conveyor and are angled outwardly whereby heated air is focused downwardly and laterally across the path of travel of the conveyor, but not parallel thereto. Finally, if desired, the heated air at the entrance to the conveyor may be further restricted by perforated strips overlying the rectangular openings to further reduce said openings.

15 Claims, 6 Drawing Sheets

HIGH VELOCITY CONVEYOR OVEN

BACKGROUND OF THE INVENTION

This invention relates to a conveyor oven useful primarily for commercial food preparation. The oven may be adapted to cook a wide variety of food products from poultry to bakery products, and preferably is useful in the cooking of pizza. The oven of this invention is intended to provide, selectively, very high velocity convection currents which impinge upon the food to be cooked so that the food product is cooked rapidly and efficiently to thereby optimize the heat requirements and minimize the release of heat to the ambient atmosphere.

DESCRIPTION OF THE PRIOR ART

Conveyor ovens or tunnel heaters have been in use for several years in the fast food industry to cook, primarily, pizzas. In the cooking of pizza, it is necessary to recognize different heating requirements for the crust and the topping. For example, if the heating requirements for the dough shell are applied to the topping, the cheese in all likelihood will burn. On the other hand, if the heating requirements for the topping are applied to the dough shell, in a conveyor oven, the shell will emerge from the oven undercooked. It is desirable, in many instances, to cook the shell so that the edges are crusty whereas the center of the shell is more pliable or chewy. The cooking requirements are further complicated by the thickness of the pizza shell desired. For example, the heating characteristics applied to a thick pizza shell could not be applied to a thin shell without overcooking the same. Furthermore, different characteristics are applicable when the product to be cooked is initially frozen. In order to ensure cooking throughout the frozen product, it is necessary to promote both melting and migration of the water therein from the interior of the product to the surface so that it may be removed. If only the surface cooks, obviously the interior will remain frozen and, therefore, it is necessary to provide cooking conditions wherein the product thaws and the water therein migrates to the surface as part of the cooking process and is evaporated or swept away from the surface during the cooking process.

In one proposed solution, as described in the conveyor ovens of, for example, U.S. Pat. Nos. 4,377,109; 4,471,000; and 4,776,107, hot air under pressure from a burner is introduced into mutually spaced nozzles which are disposed only below the product to be cooked and extend across the path of travel of the conveyor. As the product passes along through the conveyor oven, the crust is directly impinged upon by a stream of heated air, successively, from each nozzle. However, the space between products permits the exposed nozzles to direct heat upwardly against the overhead of the cooking chamber whereupon the stream of heated air is reflected downwardly onto the surface of the product to be cooked. In the case of pizza then, the underside of the pizza is subjected to heated air at a much higher velocity. The upper surface, however, with the cheese and toppings, encounters the reflected air and a certain amount of radiant energy for slower cooking. As will be obvious to those skilled in the art, the higher velocity convection currents have the effect of raising the temperature of the surface upon which the currents impinge rapidly, and also rapidly removing moisture therefrom.

In U.S. Pat. Nos. 4,471,750 and 4,576,090, there are provided foraminous air plates both above and below the product to be cooked which are mutually spaced and separated by nonforaminous plates so that the product is subjected to a blanket of turbulent heated air both above and below as it passes through the foraminous section and then subjected to more indirect heat under much lower velocity as it passes through the imperforate zone. The products then pass through nondiscrete zones of high and relatively low convection heating. This is applied to both the upper and lower surfaces of the products, but the cooking conditions on these surfaces are not necessarily the same.

When the product passes through the high convection heating zone, or the perforate zone, the surface moisture is rapidly evaporated and swept away. Upon encountering the low convection heating zone or imperforate zone, subsurface moisture is permitted time to percolate to the surface. It is then evaporated and removed as the product enters the next high convection heating zone. Furthermore, the length of such zones can be varied to achieve different heating or cooking conditions. For example, the length of travel through the imperforate zone which governs the cooking conditions on the upper surface, can be much longer than that used to cook the undersurface.

In the aforementioned patents, there was described a novel ducting system wherein heated air from a burner was blown through a scroll-shaped passageway and a venturi section into a plenum for increased turbulence so that the air passing through the perforate sections onto the product will be in a turbulent flow like a heated blanket of air rather than discrete jets.

The nozzles described in U.S. Pat. Nos. 4,377,109 and 4,471,000 are elongated and essentially extend laterally across the entire width of the conveyor. These nozzles in effect then direct heated air against the bottom of the article to be cooked and, as noted above, reflected convection currents from the overhead portion of the cooking chamber supply heat to the upper surface. In contrast, nozzles are described, for example, in U.S. Pat. Nos. 4,591,333; 4,626,661; and 4,679,542, which are individual circular nozzles. A plurality are mutually spaced across the cooking chamber in these patents and in general are intended to heat discrete areas with focused columnated jets of heated air. See also, U.S. Pat. Nos. 4,154,861 and 4,338,911.

Similarly, in U.S. Pat. No. 3,908,533, slits are provided which extend transverse to the path of travel of the conveyor and in U.S. Pat. No. 4,701,340, discrete jets are described as being disposed above and below the food to be cooked at the beginning and ending of the heating chamber with a middle chamber having discrete jets below the food and steam above.

In an effort to design a conveyor oven which will cook rapidly and efficiently and which will be adaptable to cook a wide variety of foods in addition to pizza, U.S. Pat. No. 4,960,100 describes a conveyor oven wherein the lower surface of the food to be cooked was heated by convection currents from slot-type nozzles which extend laterally across the path of the conveyor in a manner similar to that described, for example, in U.S. Pat. Nos. 4,377,109 and 4,471,000. However, the upper surface of the food to be cooked was heated by a turbulent blanket of heated air somewhat similar to that described in U.S. Pat. Nos. 4,471,750 and 4,576,090. The turbulent flow of heated air through foraminous plates then was generated by a common heater and dispensed into a plenum. Foraminous sections then release the convection currents in a turbulent flow, and these sections were spaced apart by imperforate sections. In this way, the upper surface of the food to be cooked encountered a blanket of hot air followed by an area of reduced temperature and turbulence, which in turn was followed by another area of increased turbulence and temperature throughout the length of the travel through the cooking chamber.

SUMMARY OF THE INVENTION

While the last described above conveyor oven was found to function quite well, it remains necessary to design a conveyor oven which will maximize the velocity and cooking rate in the cooking area primarily through the upper air distribution system whereby the upper surface of food to be cooked will encounter high velocity convection currents to maximize cooking efficiency. Furthermore, recognizing that different food products require different cooking temperatures, the convection currents dispensed on the upper surface of the food furthermore must be regulated and, it is necessary to dispense the convection currents upon the upper surface of the food in a uniform velocity and temperature across the entire width of the path of travel of the conveyor. For example, the air distribution system must compensate for the fact that the heated air entering the upper air distribution system from the heater and blower will enter at a higher pressure adjacent the entrance than normally to be expected across the path of travel of the conveyor. In other words, air pressure adjacent the entrance to a plenum or the like will be higher than the air pressure downstream from the entrance, and if the convection currents are to be dispensed from a plenum in an even fashion, a structural configuration must be used which will equalize the pressure across the plenum.

It has been discovered that when an upper air plenum is provided, distribution can be equalized and controlled by a number of structural features to be described hereinafter. The plenum itself is designed to receive heated air from a burner via a blower which typically supplies a plenum above the food to be cooked and a plenum below the food to be cooked. Convection currents from the lower plenum then preferably exit through an air distribution system similar to that described in the lower distribution system of the conveyor oven in U.S. Pat. No. 4,960,100.

The upper air distribution system, however, has been designed to both minimize the air movement outside of the oven cavity, to minimize the velocity of the convection currents at the entrance to the cavity and also at the exit, if desired, and to equalize a high velocity flow rate of convection currents across the upper surface of the food to be cooked in mutually spaced areas along the path of travel.

Specifically, mutually spaced slots are provided which extend laterally to the path of travel of the conveyor across a first plate which forms the upper portion of the oven cavity. The mutually spaced slots are tapered, opening away from the entrance wherein the heated air enters the upper plenum and offsetting angled flanges depend from each slot into the oven cavity. The flanges are of a predetermined length and are angled to direct the flow of air from the slot downwardly, but by providing only two of such flanges, the heated air is directed on two sides only. In addition, the upper plenum chamber itself tapers to a minimum height downstream of the entrance to further regulate the air pressure through the slots. The first plate then defines the slots and the integral depending flanges. Above the first plate then is disposed a second plate having a plurality of rectangular openings which are in registry with the slots. The openings then control the total amount of air exiting the upper plenum chamber. Finally, about 30% of the openings adjacent the entrance, and if desired, the exit, are covered with a foraminous strip to further restrict the flow of heated air therethrough. By reducing the velocity, especially at the entrance, the flow of air exiting the cavity is minimized and, in addition, the convection currents tend not to disturb the food, especially if loose toppings are present, until the path of travel enters the heating area whereupon such toppings may melt.

Accordingly, it is an object of this invention to provide an improved conveyor oven design wherein the convection currents used to heat the food are regulated across the upper surface of the food to be cooked to provide a uniform high velocity of downwardly directed air currents which are interspersed by areas of reduced velocity and temperature along the length of travel through the oven.

It is another object of this invention to provide an improved conveyor oven wherein the velocity of downwardly directed air currents at the entrance, and preferably at the exit, is reduced to thereby minimize the loss of heated convection currents through the entrance and exit openings.

It is yet another object of this invention to provide an improved conveyor oven design which will use a very high velocity convection current impinging downwardly upon the upper surface of food to be cooked as it passes through the central portion of the conveyor oven, and a uniform high velocity flow of heated convection currents upwardly both such currents dispensed by mutually spaced slots or nozzles having areas of low velocity and lower temperature therebetween along the length of travel through the conveyor oven.

These and other objects will become readily apparent with reference to the drawings and following description wherein:

BRIEF DESCRIPTION OF THE DRAWINGS

FIG. 7b is a bottom perspective view of the structure of FIG. 7a.

DETAILED DESCRIPTION OF THE INVENTION

Figure 1:
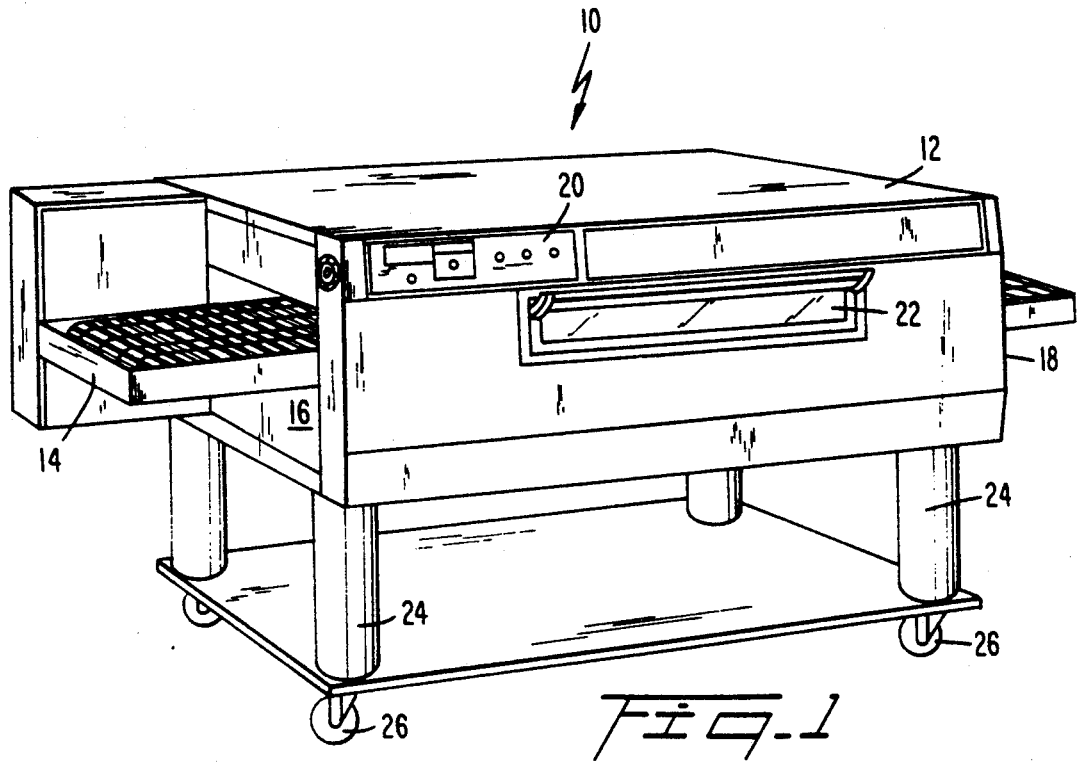
FIG. 1 is a perspective view of a typical conveyor oven according to this invention.
Figure 2:
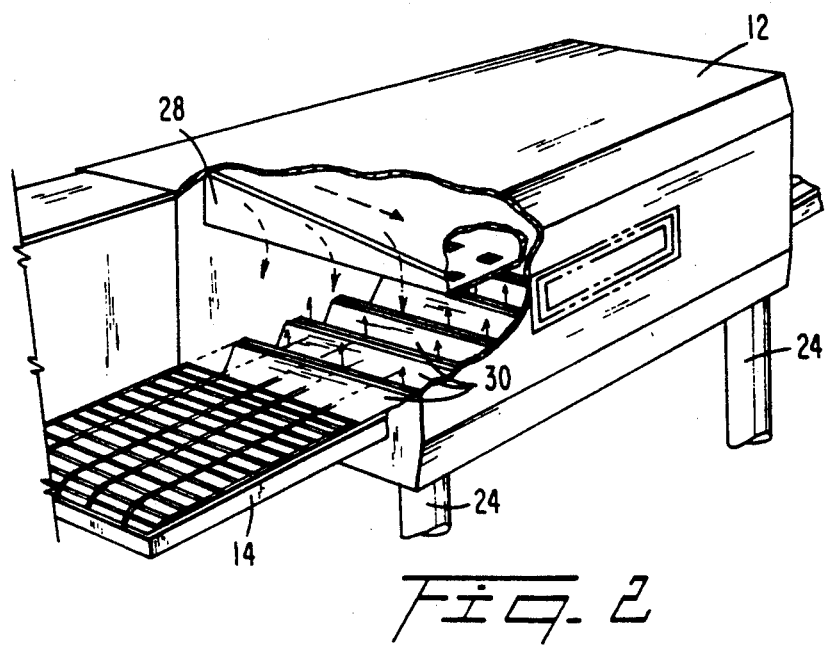
FIG. 2 is a fragmentary view of the oven of FIG. 1 with portions removed to illustrate the convection current flow in the heating portion of the oven.

With attention to the drawings and to FIGS. 1 and 2 in particular, a typical conveyor oven of this invention 10 includes a housing 12 which is essentially rectangular and provides a conveyor 14 which extends therethrough from an entrance opening 16 to an exit opening 18. A control panel 20 is provided for regulating the speed of the conveyor, burner temperature, and the like, and a window 22 may also be provided for viewing the cooking status of the food products within the oven housing 12. The embodiments shown utilize legs 24 which are mounted on rollers 26. As will be obvious to those skilled in the art, these legs and rollers do not form a part of the instant invention, and the device is intended to be adapted to be stackable if desired as shown in U.S. Pat. No. 4,960,100, the disclosure of which is hereby incorporated by reference.

As shown in FIG. 2, the convection currents within the oven housing 12 are both downwardly and upwardly directed. An upper plenum chamber, as will be described, is defined within housing 28, and upwardly directed air currents are provided by slot nozzles 30 from a lower plenum chamber (not shown in this view). The lower air flow system utilizing nozzles 30 is essentially that described in U.S. Pat. No. 4,960,100.

Figure 3:
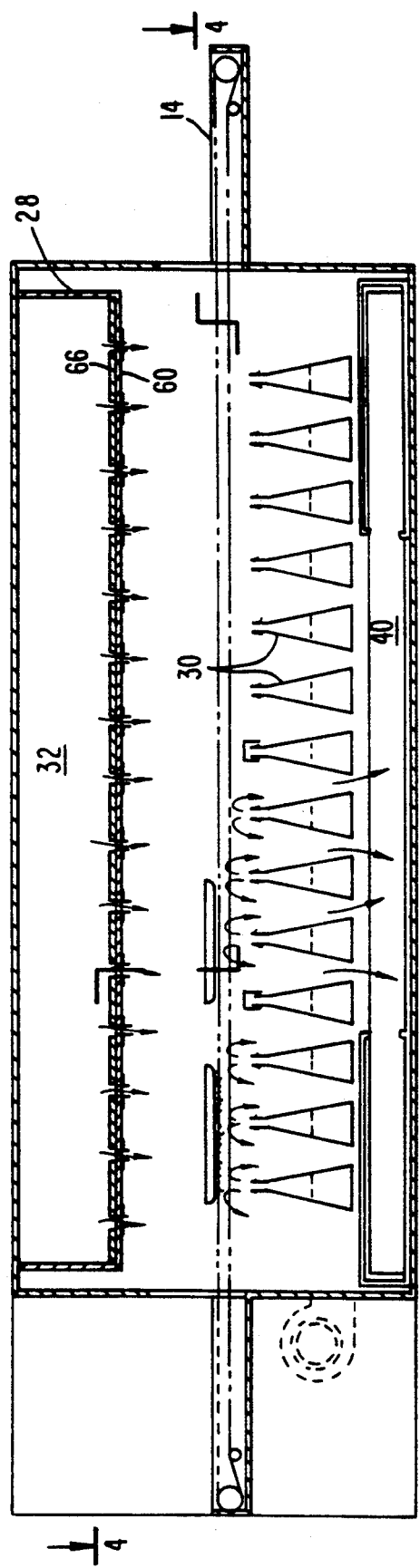
FIG. 3 is a cross-sectional longitudinal view of the oven of this invention with the upper air distribution nozzles and overlying plate of rectangular openings deleted for clarity.
Figure 4:
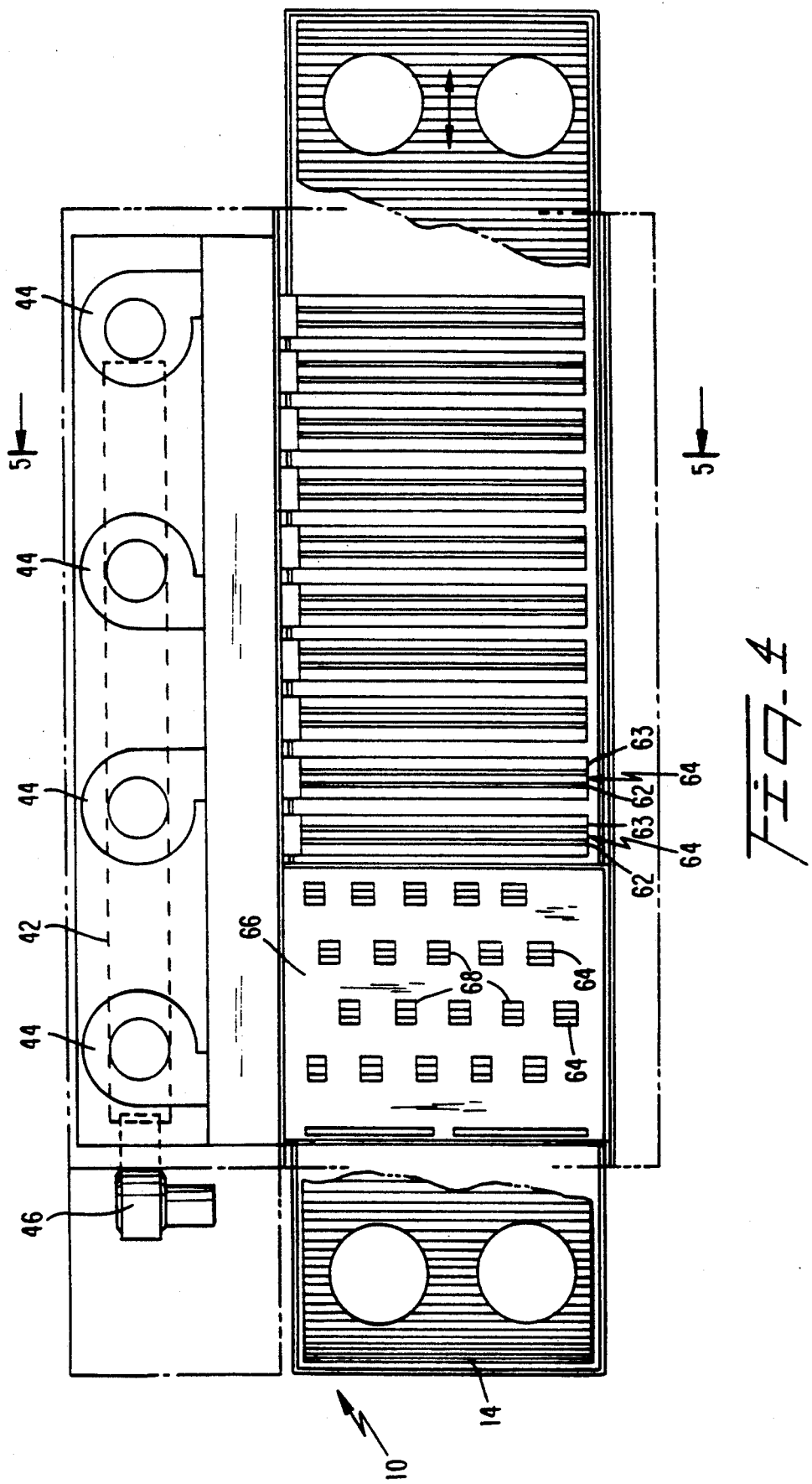
FIG. 4 is a cross-sectional view taken along lines 4—4 of FIG. 3.
Figure 5:
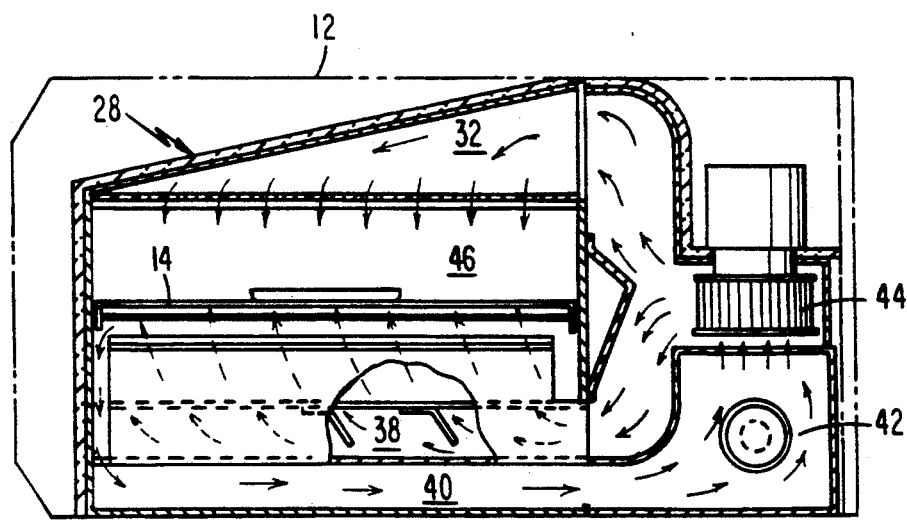
FIG. 5 is a cross-sectional view taken along lines 5—5 of FIG. 4.
Figure 6:
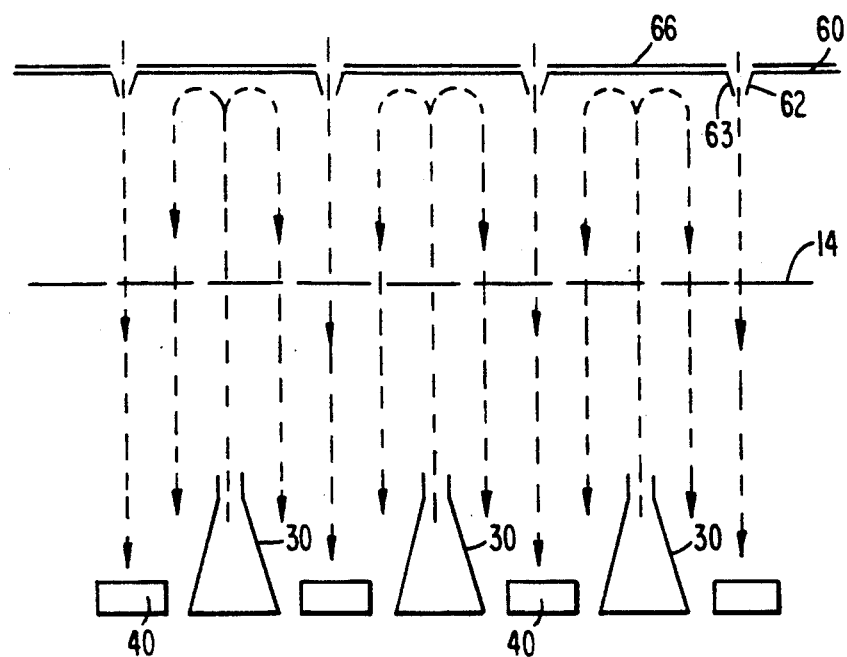
FIG. 6 is a schematic view illustrating the typical flow of hot convection currents within the oven of this invention.
Figure 7A:
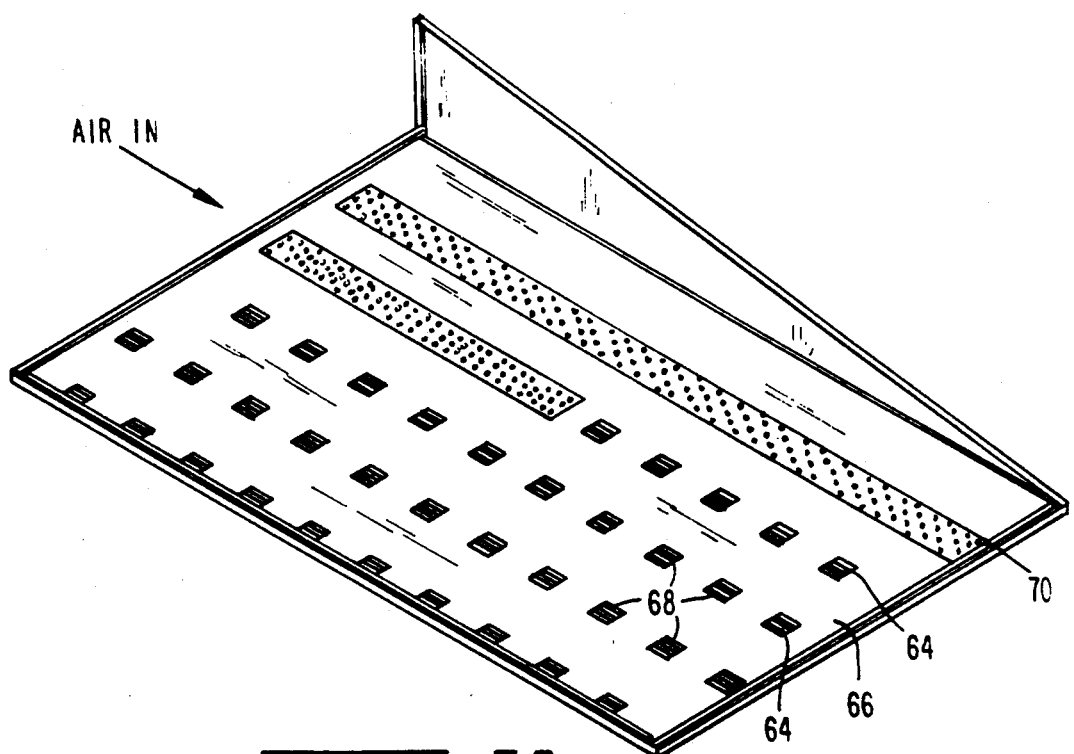
FIG. 7a is a top perspective view of a portion of the upper air distribution chamber.
Figure 7B:
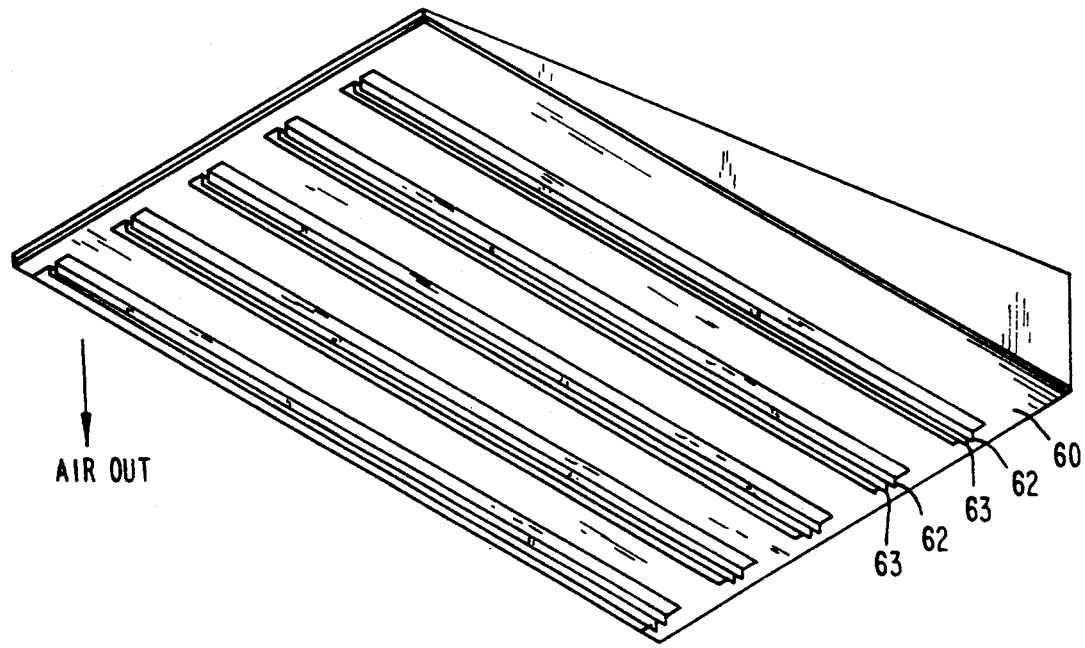

With attention to FIGS. 3 and 4, the upper air chamber 28 houses a plenum 32 and the individual slot nozzles 30 which dispense heated convection currents upwardly are fed through a lower plenum chamber 38 shown in FIG. 5. An air return 40 below nozzles 30 is provided which in turn circulates air back to a burner 42, and through a blower 44 which returns the heated air to plenum chambers 32 and 38 for admission to the cooking chamber 46. As will be obvious to those skilled in the art, mutually spaced blowers 44 and burner tubes 42 may be provided along the length of the oven 10 as shown, for example, in FIG. 4 or a single burner tube 42 fired by a burner 46 may be used.

Figure 8:
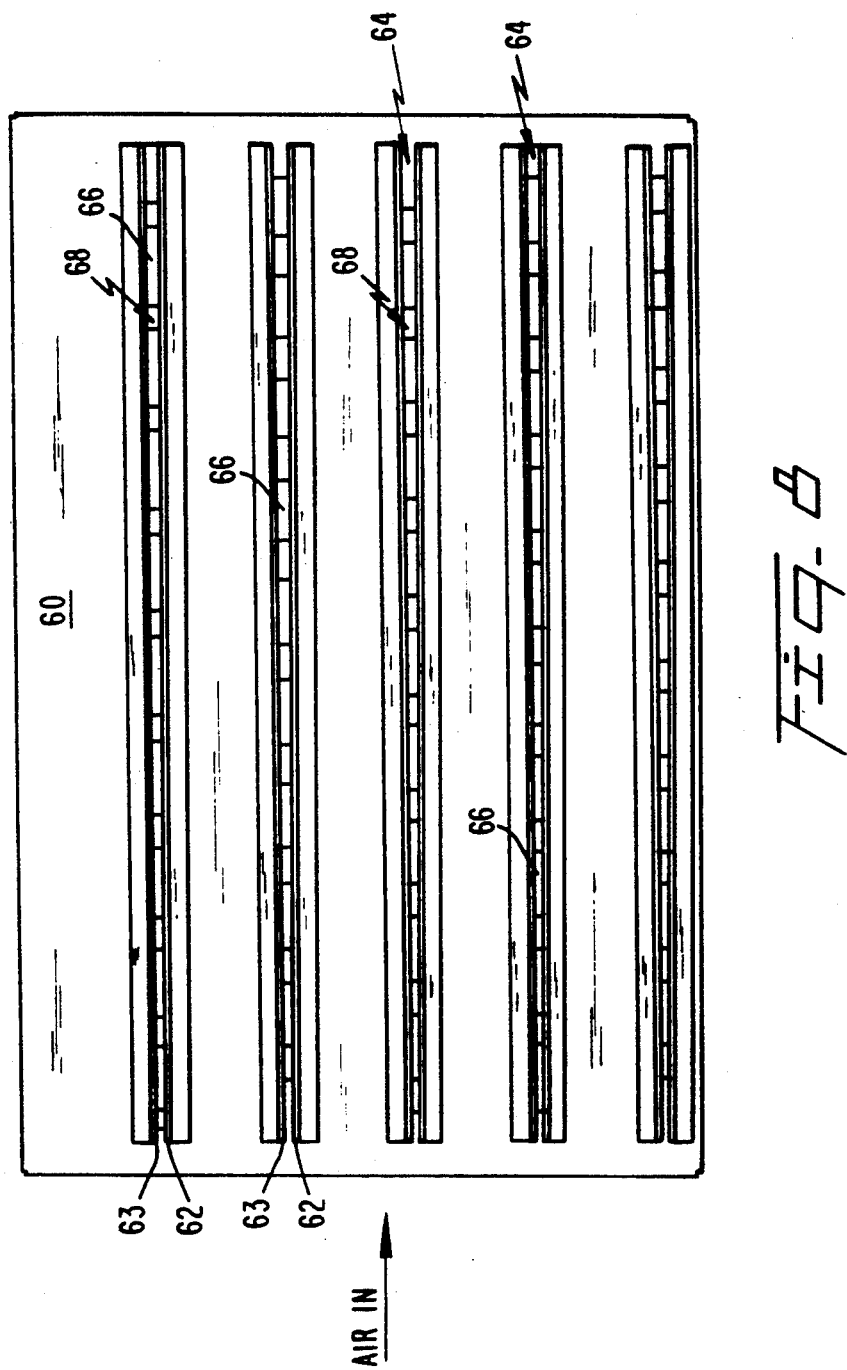
FIG. 8 is a bottom view similar to FIG. 7b.

The upper air distribution system for convection currents directed onto the upper surface of the food may be described as follows. With reference primarily to FIGS. 7a, 7b, 8 and FIG. 4, there is provided immediately above the conveyor 14, an upper plate 60. Plate 60 defines mutually spaced flanges 62 and 63, which between them define grooves or slots 64 which are best seen in FIGS. 4 and 8.

A second plate 66 overlies plate 60 and provides a plurality of mutually spaced rectangular openings 68 which register on slots 64 in plate 60 as shown, for example, in FIG. 4.

As shown in FIG. 8, slots 64 taper away from the flow of air so that the slots 64 open as the air in plenum 32 flows downstream to equalize the flow through slots 64. The taper is generally 0.25 to 3 degrees in the downstream direction. The depending slot flanges 62 and 63 may be from 0.25 to 1.0 inch in length depending from the plate 60 and inclined at an angle of 8 to 16 degrees to form the air stream on the food to be cooked which flows through the rectangular openings 68 in upper plate 66 and slots 64. With attention to FIG. 7a, foraminous strips 70 are also provided overlying rectangular openings to further restrict the air flow therethrough. It has been discovered that typically openings 68 account for about 30% of the area of plate 66 and the perforated metallic strips 70 have approximately 32% open area and are in turn fixed over about 30% of the rectangular openings 68. This has been found to decrease the velocity of the convection currents therethrough to below about 2,000 ft. per min. which in turn, in the event that a pizza is to be cooked, prevents dislodging of the topping ingredients as the pie advances into the oven and minimizes heat loss. Strips 70 then are provided over the openings adjacent the entrance 16 and may be provided adjacent the exit 18 if desired.

By incorporating the method of this invention, the film coefficient on food to be cooked for convection heat transfer can be increased, for example, from a value of 8-13 BTU/hr. ft.$^2$-° F. to 14-23 BTU/hr. ft.$^2$-° F. In addition, air velocities upon the upper portion of the food products can be increased from a maximum of about 2200 ft. per min. to 4000 ft. per min. to thereby reduce the cooking time of from 10 to 30%.

Accordingly, the device of this invention then by more efficiently distributing the heated air currents on the upper portion of the food, in combination with heated air currents dispensed upon the lower surface of the food, provides, in the interior of the cooking cavity a much greater velocity convection current in pulsating fashion whereby the food product encounters the current of air and then a lower velocity area followed by another pulse of air as it passes over individual slots 30 and under openings 68. The increased velocity then results in a marked decrease in the cooking time.

In summary, it has been found that cooking characteristics in a conveyor oven can be dramatically improved with the convection delivery system of the instant invention for the upper surface of the food product to be cooked. The device of this invention uses neither a turbulent blanket of heated air to cook the upper surface nor discrete jets of heated air. The improved results achieved with the device of this invention are achieved by dispensing air from a plenum initially through rectangular openings which are mutually spaced along the length of the path of travel of the conveyor and are located in the upper wall of the cooking chamber (this corresponds to the lower wall of the upper plenum). The rectangular openings constitute, preferably, approximately 30% of the plate area. The rectangular openings then register on tapered slots which extend laterally across the path of travel of the conveyor. With the heated air entrance to the plenum located on the side of the conveyor, the slots taper opening away from the entrance so that the rectangular openings downstream correspond to an increased slot area. The slots then each have depending angled flanges which directed the heated air downwardly, but confine the downward direction on two sides only. The two sides are substantially perpendicular to the path of travel of the conveyor. The flanges, extending the length of the slots then direct the air passing therethrough in the directions lateral or perpendicular to the conveyor travel, but do not restrict the turbulent flow in the directions parallel to the path of travel of the conveyor. In this way, it has been discovered that a greatly increased velocity can be achieved which, in turn, improves the heat transfer at the surface of the food product to be cooked and shortens the cooking time dramatically. Moreover, the flanges help minimize loss of convection currents at the entrance and exit to the conveyor.

Furthermore, as an optional but preferred embodiment, the rectangular openings at the entrance to the conveyor, and at the exit if desired, are further restricted by foraminous strips which cover the rectangular openings and have a hole pattern therein providing an open area of about 32% and such strips are fixed over about 30% of the rectangular air ports.

As previously indicated, the heat delivery system to the underside of the food to be cooked is substantially the same as that disclosed in prior patents and consists of tapered slot nozzles which extend laterally to the path of travel of the conveyor and are mutually spaced. If desired, an air return is provided between the nozzles and a lower plenum supplies heated air thereto. Appropriate baffles are provided in the lower plenum to regulate the flow of air across the nozzles perpendicular to the path of travel of the conveyor. Preferably, the heated air is delivered to the upper and lower plenums by one or more blowers which in connection with a heat tube, heat the air from the air return to recirculate it.

Finally, both plenums, the upper and the lower, taper to a minimum height downstream from the entrance to the plenums. In the upper plenum, the tapered height to a minimum coincides with the opening of the tapered slots so that at the area of the plenum remote from the entrance, the minimum height of the plenum corresponds with the maximum opening of the individual slots so that the air pressure across the slots is substantially the same laterally across the conveyor.

The invention may be embodied in other specified forms without departing from the spirit or essential characteristics thereto. The present embodiments are therefore to be considered in all respects as illustrative and not restrictive, the scope of the invention being indicated by the appended claims rather than by the foregoing description, and all changes which may come within the meaning and range of equivalency of the claims are therefore intended to be embraced therein.

We claim:

1. A versatile conveyor oven effective to produce a variety of different cooking conditions comprising:
    an elongated hollow cabinet defining a cooking chamber having an inlet port at one end and an outlet port at an opposite end;
    an open mesh conveyor extending through the cabinet from outside the inlet to outside the outlet and means for moving said conveyor relative to said cabinet along a path of travel in a predetermined direction through the cooking chamber so that product to be cooked placed on the conveyor at the inlet will travel on the conveyor through the cooking chamber to the outlet;
    layered plate means disposed within the cooking chamber above said conveyor and extending substantially from the inlet to the outlet for dispensing heated convection air currents downwardly upon the conveyor including a lower plate having a plurality of mutually spaced slots extending perpendicular to the path of travel of said conveyor, and the length of said lower plate, each slot having forward and rear, depending flanges spaced on either side thereof depending downwardly substantially perpendicular to the path of travel of said conveyor, an upper plate mounted on said lower plate and having a plurality of mutually spaced ports extending laterally and longitudinally the width and length of said upper plate, registering on the slots in said lower plate for restricting the flow of convection currents through said slots whereby currents passing through the ports and slots expand laterally along the flanges but are directed downwardly thereby;
    nozzle means disposed within the cooking chamber below said conveyor and extending substantially from the inlet to the outlet for dispensing mutually spaced discrete jets of heated air upwardly onto the lower surface of said conveyor along the length thereof, each jet extending laterally across the width of said conveyor;
    heating means and blower means coupled thereto for supplying heated air to said plate means and nozzle means.

2. The oven of claim 1 further comprising an upper plenum communicating between said blower means and said plate means for supplying heated air thereto.

3. The oven of claim 2 wherein said plenum is a chamber having upper, lower, and side walls disposed over said conveyor having an inlet in a side wall in communication with said blower means and said upper and lower plates constitute the lower wall of said chamber.

4. The oven of claim 3 wherein said plates means plates are contained in a plane disposed parallel to the plane containing the conveyor and the upper wall slopes toward the lower wall from a maximum height at the side wall having the inlet to a minimum at the opposite side wall.

5. The oven of claim 4 wherein said slots in the lower plate are tapered from a minimum width adjacent the side having the inlet to a maximum adjacent the opposite side.

6. The oven of claim 5 wherein the taper of said slots is at an angle of from about 0.25 to 3 degrees.

7. The oven of claim 6 wherein the flanges depend from ¼ to about one inch below said lower plate.

8. The oven of claim 7 wherein said flanges are angled away from said slots.

9. The oven of claim 8 wherein the flanges are angled at about 8 to 16 degrees from the vertical.

10. The oven of claim 4 wherein the ports in said upper plate constitute about 30% of the area of said plate.

11. The oven of claim 4 further comprising foraminous strips covering about 30% of the ports in said upper plate, adjacent at least the entrance to said oven.

12. The oven of claim 11 wherein the holes in said foraminous strip constitute about 32% of the area of said strips.

13. The oven of claim 6 wherein the width of said slots is adjustable to regulate the flow therethrough.

14. The oven of claim 1 wherein said nozzle means comprises a plurality of mutually spaced slot orifices each in a housing the interior of which is in communication with said blowers means, each orifice extending perpendicular to the path of travel of said conveyor.

15. The oven of claim 12 wherein each housing is triangular in cross-section with the orifice formed at the apex thereof said oven further comprising baffle means disposed between said blower means and housings for equalizing the pressure across each orifice.

* * * * *